Sept. 29, 1931.  L. C. SHIPPY  1,825,426
INSTRUMENT CASE
Filed May 25, 1929

Inventor
Leo C. Shippy
By Spencer Hardman & Fehr
His Attorneys

Patented Sept. 29, 1931

1,825,426

UNITED STATES PATENT OFFICE

LEO C. SHIPPY, OF ANDERSON, INDIANA, ASSIGNOR TO DELCO-REMY CORPORATION, OF ANDERSON, INDIANA, A CORPORATION OF DELAWARE

INSTRUMENT CASE

Application filed May 25, 1929. Serial No. 365,799.

This invention relates to switch structures having an inter-connecting relation with registering or indicating instruments closely coupled therewith, and it is an object of the invention to provide a unitary structure of simple design and less expensive to manufacture.

It is a further object of the instant invention to simplify the devices of the broad class.

One of the particular objects of this invention is to provide an adequate and positive means of securing transparent closures or other members within a casing, yet permitting a ready removal thereof when occasion so arises.

Further objects and advantages of the present invention will be apparent from the following description, reference being had to the accompanying drawings wherein a preferred embodiment of one form of the present invention is clearly shown.

Figure 1:
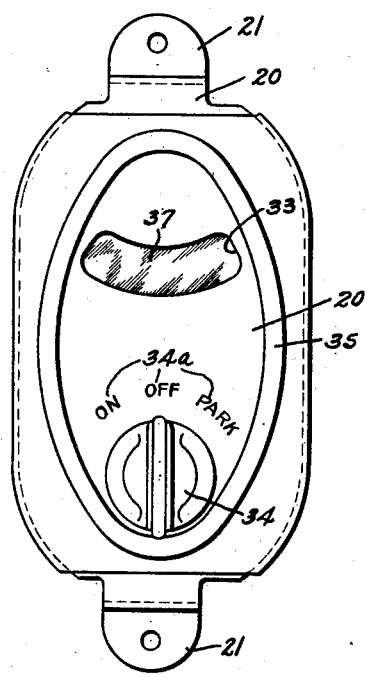
Fig. 1 is a front view of a unitary device embodying my invention.

With particular reference to the drawings, a mounting bracket which forms the main support of the unit is indicated at 20 and is provided with angularly disposed apertured ears 21 by which the bracket may be secured to the instrument board or other suitable structure of the vehicle. To the mounting bracket 20 is secured a switch case 22 enclosing a switch mechanism 23 which cooperates with a switch back 24, as is usual and well known to those skilled in the art. The mounting bracket 20 also supports an instrument case 30 which in this instance is substantially cylindrical and is provided with peripheral tangs which project through apertures in the mounting bracket 20 and are bent over into indentations 31 securing the case to the mounting bracket. The case 30 is provided with other peripheral tangs as 32 at the opposite end of said case which may be clinched over against the back of the instrument to be mounted within the case.

Figure 2:
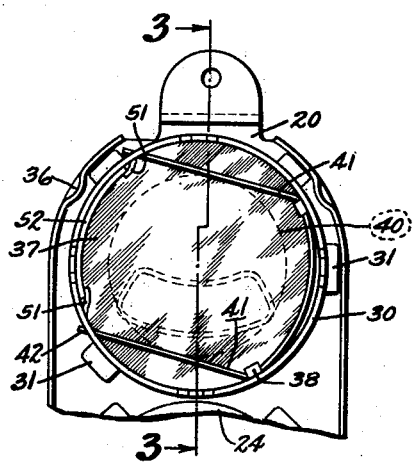
Fig. 2 is a fragmentary rear view of the same showing in detail the instant invention.
Figure 3:
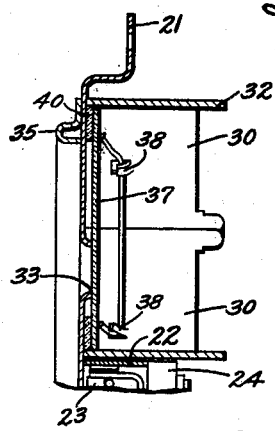
Fig. 3 is a fragmentary sectional view as indicated by the line and arrows 3—3 of Fig. 2.
Figure 4:
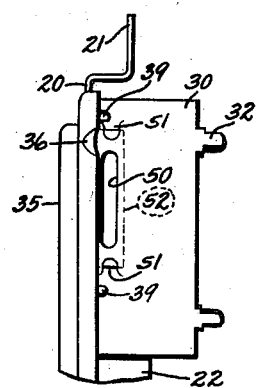
Fig. 4 is a fragmentary elevation illustrating the illumination aperture.

The mounting bracket 20 is apertured at 33 to provide an inspection opening for the interior of the instrument case 30 and further provides for the journalling of a controller 34 operable upon the switch mechanism 23 contained within the switch housing 22. The face of the bracket is appropriately decorated and provided with the proper indicia to provide a dial plate as indicated generally at 34a. A flanged bezel ring 35 is disposed against the bracket and encircles the inspection opening 33 and the switch controller 34, the bezel ring flange being deformed at 36 for securing the bezel ring to the mounting bracket as illustrated in Figs. 2 and 4. The instrument case 30 supports a transparent closure 37 for the inspection opening 33 which may be glass or the like.

Figure 5:
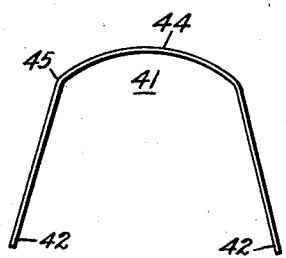
Figs. 5 and 6 are plan and edge views respectively of a retaining ring contributing to the instant invention.
Figure 6:
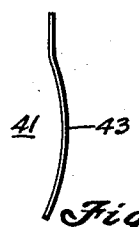

The side wall of the case is provided with inwardly directed tangs 38 and spring retaining apertures 39, which tangs and apertures are substantially equally spaced around the casing, as indicated in Fig. 2. A compressible gasket 40 is placed in the bottom of the case 30 adjacent the mounting bracket 20, against which is disposed the transparent medium 37. A bowed or U-shaped wire spring 41, substantially the shape and contour as exhibited in Figs. 5 and 6, is placed within the cup 30 so that the diverging ends 42 thereof are received by the spring receiving apertures 39 in the wall of the case 30, and so that the transverse arc like bends or bights 43 are disposed against the transparent medium 37. The main bight 44 is then pressed inwardly so that the angular junctures 45 may be hooked under the tangs 38 of the case 30. This manner of inserting the spring 41 will tend to straighten out the arc like bends 43 and to urge the transparent medium 37 against the gasket 40, so that the case 30 is substantially air and dust tight with respect to the inspection opening 33.

The instrument case 30 is provided at a suitable point in a side wall thereof with illumination apertures 50 which admits the light rays from a suitable lamp or other illumination device associated with the unit, and transmits them upon the indicating means, or registering instruments therewith in which are to be inspected through the aperture 33. At points adjacent the illumination aperture 50, the case 30 is provided with tangs 51 struck inwardly from the wall of the case so as to provide for the retention of a transparent medium 52 covering the illumination aperture 50. This structure is clearly indicated in Figs. 2 and 4 and it is obvious that the medium 52 may readily be inserted within the case, the ends of said medium being seated under the unstruck ends of the tangs 51 as illustrated in Fig. 2.

By the structure herein provided it is made possible to closely couple a switch mechanism and a registering instrument which may be adequately housed and illuminated, so that when conditioned for operation by a coincidental closing of the circuit through the switch structure, that sufficient illumination will be manifest within the case that the means of the device therein may be readily inspected through the apertures 37, and yet not produce illumination of the character of intensity to blind or glare into the eyes of the driver, as is so usual in the ordinary means of instrument illumination.

While the form of embodiment of the present invention as herein disclosed, constitutes a preferred form, it is to be understood that other forms might be adopted, all coming within the scope of the claims which follow.

What is claimed is as follows:

1. In an instrument case, the combination comprising, a mounting bracket provided with a dial plate and supporting an instrument case, said dial plate and mounting bracket providing an inspection opening, said instrument case being apertured to provide an illumination opening, a transparent medium for each of said openings, said case provided with tangs which cooperate in the retention of each of said transparent mediums, and resilient means disposed between some of said tangs and one of said transparent mediums for securing the same within the case.

2. In an instrument case, the combination comprising, a mounting bracket provided with a dial plate and supporting an instrument case, said dial plate and mounting bracket providing an inspection opening, said instrument case being apertured to provide an illumination opening, a transparent medium for each of said openings, said case provided with tangs adjacent one of said openings for securing the respective transparent medium, and with other tangs for anchoring a spring ring disposed against the other transparent medium.

3. In an instrument case, the combination comprising, a mounting bracket provided with a dial plate and supporting an instrument case, said dial plate and mounting bracket providing an inspection opening, said instrument case being apertured to provide an illumination opening, a transparent medium for each of said openings, said case provided with tangs adjacent the light aperture for receiving the respective transparent medium, other tangs provided by said case for retaining the other transparent medium.

4. In an instrument case, the combination comprising, a mounting bracket provided with a dial plate and supporting an instrument case, said dial plate and mounting bracket providing an inspection opening, said instrument case being apertured to provide an illumination opening, a transparent medium for each of said openings, said case provided with tangs adjacent the light aperture for receiving the respective transparent medium, other tangs provided by said case for retaining the other transparent medium, resilient means anchored under said other tangs and disposed against one of said transparent mediums for maintaining the same in close association relative to the respective opening.

5. In an instrument case, the combination comprising, a mounting bracket provided with a dial plate and supporting an instrument case, said dial plate and mounting bracket providing an inspection opening, said instrument case being apertured to provide an illumination opening, a transparent medium for each of said openings, said case provided with tangs adjacent the light aperture for receiving the respective transparent medium, other tangs provided by said case for retaining the other transparent medium, a U-shaped spring secured under said other tangs for retaining the second transparent medium within the instrument case.

6. In an instrument case, the combination comprising, a mounting bracket provided with a dial plate and supporting an instrument case, said dial plate and mounting bracket providing an inspection opening, said instrument case being apertured to provide an illumination opening, a transparent medium for each of said openings, said case provided with tangs adjacent the light aperture for receiving the respective transparent medium, other tangs provided by said case for retaining the other transparent medium, a bowed wire spring disposed between said tangs and the second transparent medium and urging the same in close engagement with the inspection apertures.

7. In an instrument case, the combination comprising, a mounting bracket provided with a dial plate and supporting an instrument case, said dial plate and mounting bracket providing an inspection opening, said instrument case being apertured to provide an illumination opening, a transparent medium for each of said openings, said case provided with tangs adjacent the light aperture for receiving the respective transparent medium, other tangs provided by said case for retaining the other transparent medium, a bowed wire spring disposed between said tangs and the second transparent medium and urging the same in close engagement with the inspection apertures, the free ends of said bowed spring being received in lateral apertures of the case adjacent the mounting bracket.

8. In an instrument case, the combination comprising, a mounting bracket provided with a dial plate and supporting an instrument case, said dial plate and mounting bracket providing an inspection opening, said instrument case being apertured to provide an illumination opening, a transparent medium for each of said openings, said case provided with tangs adjacent the light aperture for receiving the respective transparent medium, other tangs provided by said case for retaining the other transparent medium, a bowed wire spring disposed between said tangs and the second transparent medium and urging the same in close engagement with the inspection apertures, the free ends of said bowed spring being received in lateral apertures of the case adjacent the mounting bracket, said spring being arced transverse to said main bow, so that when the free ends thereof are inserted within the spring receiving apertures of said case and that the bight is depressed to be received under the tangs that the arched portion of said spring will engage the transparent medium at substantially diametric points and will urge said medium toward the mounting bracket.

9. In an instrument case, the combination comprising, a mounting bracket provided with a dial plate and supporting an instrument case, said dial plate and mounting bracket providing an inspection opening, said instrument case being apertured to provide an illumination opening, a transparent medium for each of said openings, said case provided with tangs adjacent said openings for securing the respective transparent mediums, and a spring ring cooperating with some of said tangs for securing one of said mediums.

10. In an instrument case, the combination comprising a case having a side wall and an apertured front wall, a transparent plate covering the aperture, and means for retaining the plate against the front wall comprising lugs integral with the case and extending inwardly from the side wall and a U-shaped wire part having a resilient yoke portion adapted to be secured in position against the sides of the lugs facing the plate and resilient branches normally bowed toward the plate, each branch bearing against the plate, and means provided by the case for engaging the free ends of the branches.

11. In an instrument case, the combination comprising a case having a side wall and an apertured front wall, a transparent plate covering the aperture, and means for retaining the plate against the front wall comprising resilient parts normally bowed toward the plate, and members provided by the side wall of the case for engaging the ends of the resilient parts.

12. In an instrument case, the combination comprising a case having a side wall and an apertured front wall, a transparent plate covering the aperture, and means for retaining the plate against the front wall comprising a resilient wire part having branches 42 joined by a bight 44 and branches normally diverging from the bight to an extent such as to require moving the branches together when placing the part within the case, each branch having a bowed portion engaging the plate, and means provided by the side wall of the case for retaining the wire part in position.

In testimony whereof I hereto affix my signature.

LEO C. SHIPPY.